United States Patent
Kenney

(10) Patent No.: US 11,562,771 B2
(45) Date of Patent: *Jan. 24, 2023

(54) METHOD AND SYSTEM FOR SYNCHRONIZING PRESENTATION SLIDE CONTENT WITH SOUNDTRACK

(71) Applicant: William Craig Kenney, Hunt Valley, MD (US)

(72) Inventor: William Craig Kenney, Hunt Valley, MD (US)

(73) Assignee: Bolt-On IP Solutions, LLC, Boynton Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,963

(22) Filed: Jun. 29, 2022

(65) Prior Publication Data
US 2022/0351754 A1  Nov. 3, 2022

Related U.S. Application Data

(63) Continuation of application No. 17/552,647, filed on Dec. 16, 2021, now Pat. No. 11,417,366.
(Continued)

(51) Int. Cl.
*G11B 27/10* (2006.01)
*G10L 15/26* (2006.01)
(Continued)

(52) U.S. Cl.
CPC .............. *G11B 27/10* (2013.01); *G06F 3/165* (2013.01); *G10L 15/26* (2013.01); *G10L 13/033* (2013.01); *G10L 21/055* (2013.01); *G10L 25/87* (2013.01)

(58) Field of Classification Search
CPC ....... G11B 27/10; G06F 3/165; G06F 40/169; G10L 15/26; G10L 13/033; G10L 21/055; G10L 25/87
See application file for complete search history.

(56) References Cited

U.S. PATENT DOCUMENTS

2003/0236792 A1* 12/2003 Mangerie ............ G06F 16/4393
2021/0056251 A1*  2/2021 Parmar ................ G06V 40/103

FOREIGN PATENT DOCUMENTS

WO   WO-2008115747 A2 *  9/2008  ........... G11B 27/034

* cited by examiner

*Primary Examiner* — Quoc A Tran
(74) *Attorney, Agent, or Firm* — Sagacity Legal, PLLC

(57) ABSTRACT

A method for synchronizing a plurality of presentation slide content with a soundtrack comprises obtaining the plurality of presentation slide content and the soundtrack including a plurality of audio samples. The presentation slide content comprises a video or an animation in the presentation slide. Each presentation slide content is associated with a metadata and each audio sample is indexed with a corresponding timecode. The method comprises detecting triggering event that identifies a current audio sample of the soundtrack as an audio sample to transition from a first presentation slide content to a second presentation slide content, and obtaining a timecode indexed with the identified audio sample, associating the timecode with the metadata of the second presentation slide content to link the second presentation slide content with the identified audio sample, and generating a synchronized presentation multimedia file having the linked second presentation slide content with the identified audio sample.

20 Claims, 9 Drawing Sheets

Related U.S. Application Data

(60) Provisional application No. 63/151,407, filed on Feb. 19, 2021.

(51) Int. Cl.
*G06F 3/16* (2006.01)
*G10L 13/033* (2013.01)
*G10L 21/055* (2013.01)
*G10L 25/87* (2013.01)
*G06F 17/00* (2019.01)

METHOD AND SYSTEM FOR SYNCHRONIZING PRESENTATION SLIDE CONTENT WITH SOUNDTRACK

CROSS-REFERENCE TO RELATED APPLICATIONS

The present application is a continuation of U.S. Non-Provisional application Ser. No. 17/552,647, filed Dec. 16, 2021, entitled "Method and System For Synchronizing Presentation Slide Content with a Soundtrack" which claims the benefit of U.S. Provisional Application No. 63/151,407, filed Feb. 19, 2021, each of which is incorporated by reference herein in its entirety.

BACKGROUND OF THE INVENTION

In today's digital age, more and more businesses are utilizing multimedia presentations to create tutorials, sales presentations, and the like. Although, there are several tools to accomplish the same, the available mechanisms make the entire process of creating the multimedia presentations tedious, complex, and time-consuming. Moreover, the available tools do not provide any flexibility to the users and are difficult to change.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
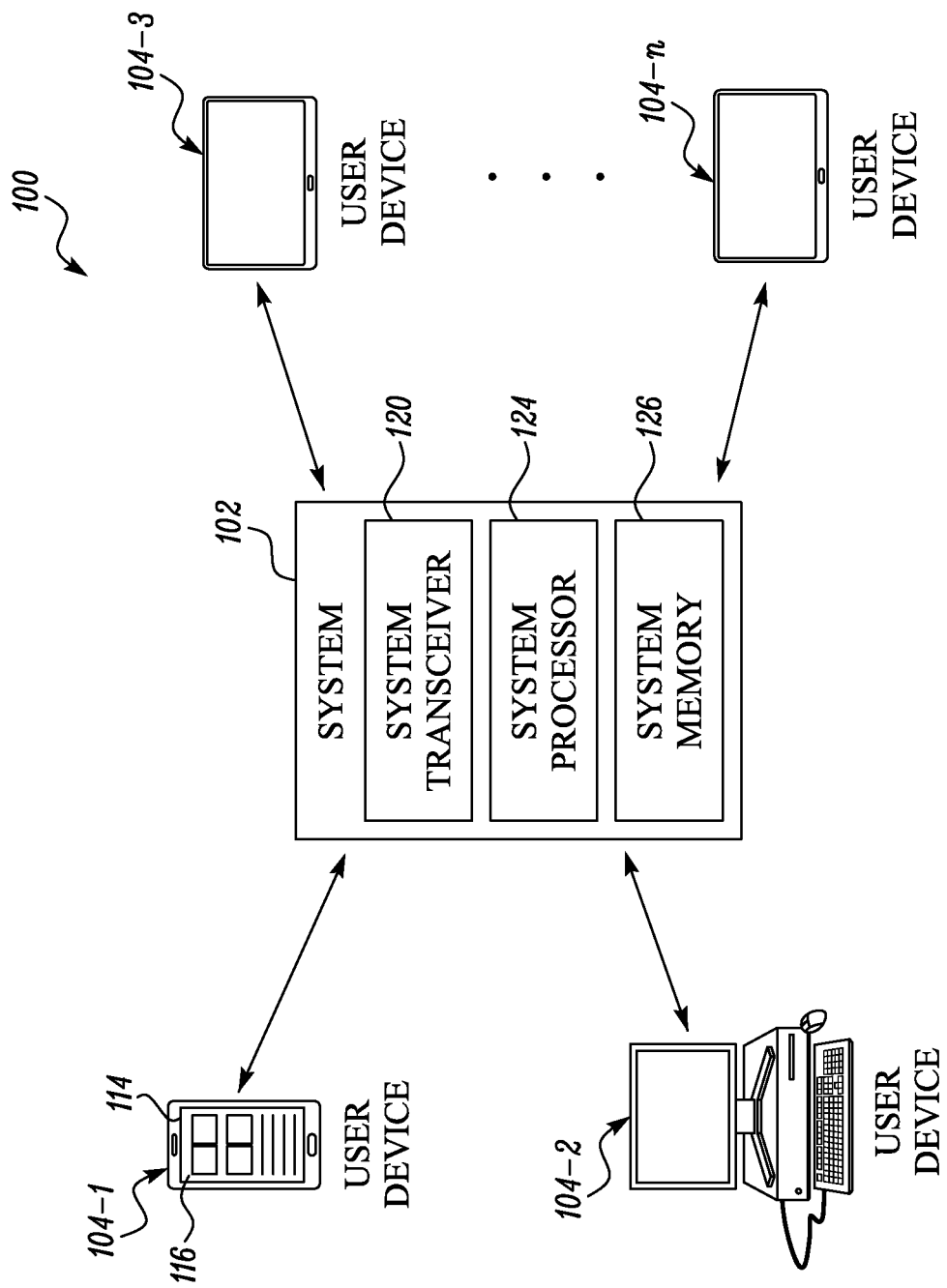
FIG. 1 illustrates an exemplary environment including a system for synchronizing a plurality of presentation slide content with a soundtrack, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, a method for synchronizing a plurality of presentation slide content in a presentation slide with a soundtrack is described. The method comprises obtaining the plurality of presentation slide content arranged in a predefined order in the presentation slide and the soundtrack including a plurality of audio samples. The presentation slide content comprises a video in the presentation slide or an animation in the presentation slide. Each presentation slide content is associated with a metadata representing unique identification of the corresponding presentation slide content and each audio sample is indexed with a corresponding timecode. The method further comprises detecting a triggering event identifying an audio sample from the plurality of audio samples of the soundtrack to transition from a first presentation slide content to a second presentation slide content of the plurality of presentation slide content in the presentation slide. The method further comprises obtaining a timecode indexed with the identified audio sample of the soundtrack corresponding to the detected triggering event and associating the obtained timecode with the metadata of the second presentation slide content in the presentation slide to link the second presentation slide content in the presentation slide with the identified audio sample. Further, the method comprises generating a synchronized presentation multimedia file having the linked second presentation slide content in the presentation slide with the identified audio sample.

In another aspect, a system for synchronizing a plurality of presentation slide content in a presentation slide with a soundtrack is described. The system comprises a memory and a processor communicatively coupled to the memory. The memory stores instructions executable by the processor, and wherein upon execution of the stored instructions, the processor is configured to obtain the plurality of presentation slide content arranged in a predefined order in the presentation slide and the soundtrack including a plurality of audio samples. The presentation slide content comprises a video in the presentation slide or an animation in the presentation slide. Each presentation slide content is associated with a metadata representing unique identification of the corresponding presentation slide content and each audio sample is indexed with a corresponding timecode. The processor is further configured to detect a triggering event identifying an audio sample from the plurality of audio samples of the soundtrack to transition from a first presentation slide content to a second presentation slide content of the plurality of presentation slide content in the presentation slide and obtain a timecode indexed with the identified audio sample of the soundtrack corresponding to the detected triggering event. The processor is further configured to associate the obtained timecode with the metadata of the second presentation slide content in the presentation slide to link the second presentation slide content in the presentation slide with the identified audio sample and generate a synchronized presentation multimedia file having the linked second presentation slide content in the presentation slide with the identified audio sample.

In yet another aspect, a method for synchronizing a plurality of presentation slide content with a soundtrack is described. The method comprises obtaining the plurality of presentation slide content arranged in a predefined order and the soundtrack including a plurality of audio samples. Each presentation slide content is associated with a metadata representing unique identification of the corresponding presentation slide content and each audio sample is indexed with a corresponding timecode. The method further comprises detecting a triggering event identifying an audio sample from the plurality of audio samples of the soundtrack to transition from a first presentation slide content to a second presentation slide content of the plurality of presentation slide content. The method further comprises obtaining a timecode indexed with the identified audio sample of the soundtrack corresponding to the detected triggering event and associating the obtained timecode with the metadata of the second presentation slide content to link the second presentation slide content with the identified audio sample. Further, the method comprises generating a synchronized presentation multimedia file having the linked second presentation slide content with the identified audio sample. The method further comprises receiving one or more edits to the second presentation slide content of the plurality of presentation slide content and updating the second presentation slide content to reflect the received one or more edits. Further, the method comprises replacing the corresponding second presentation slide content in the obtained plurality of presentation slide content with the updated second presentation slide content and detecting a further triggering event to associate the metadata of the replaced second presentation slide content with the timecode of the identified audio sample of the plurality of audio samples of the soundtrack. The method further comprises associating the metadata of the replaced second presentation slide content with the timecode of the identified audio sample.

FIG. 1 illustrates an environment 100 implementing an exemplary system 102 in accordance with various embodiments. The system 102 is configured to synchronize a plurality of presentation slide content with a soundtrack to generate a synchronized presentation multimedia file. For example, the presentation slide content includes, but is not limited to, one or more of a presentation slide, a video in a presentation slide, an animation in a presentation slide, or the like. The soundtrack includes, but is not limited to, an audio track, such as a narration, a song, or the like, having a plurality of audio samples. In accordance with various embodiments, each audio sample corresponds to a unique portion of the soundtrack. Further, the synchronized presentation multimedia file corresponds to a multimedia file having one or more of a plurality of presentation slide content synchronized with a corresponding unique audio sample of the soundtrack.

In addition to the system 102, the environment 100 also includes one or more user devices 104, such as, 104-1, 104-2 . . . 104-n, communicating with the system 102 over a communication network. Although not shown, a person skilled in the art would appreciate that the communication network may include, but is not limited to, a wide area network (WAN) (for example, a transport control protocol/internet protocol (TCP/IP) based network), a cellular network, or a local area network (LAN) employing any of a variety of communications protocols as is now known or in the future developed.

Each of the one or more user devices 104, such as, 104-1, 104-2 . . . 104-n, operates as an interface for a corresponding user interacting with the system 102. Each user utilizes the respective user device 104 to provide one or more inputs, such as but not limited to, the plurality of presentation slide content and the soundtrack, and receive one or more outputs, such as, but not limited to, the synchronized presentation multimedia file, from the system 102. Each user device 104 includes a plurality of electrical and electronic components, providing power, operational control, communication, and the like within the user device 104. The various components of the user device 104 will now be described hereinafter.

Figure 2:
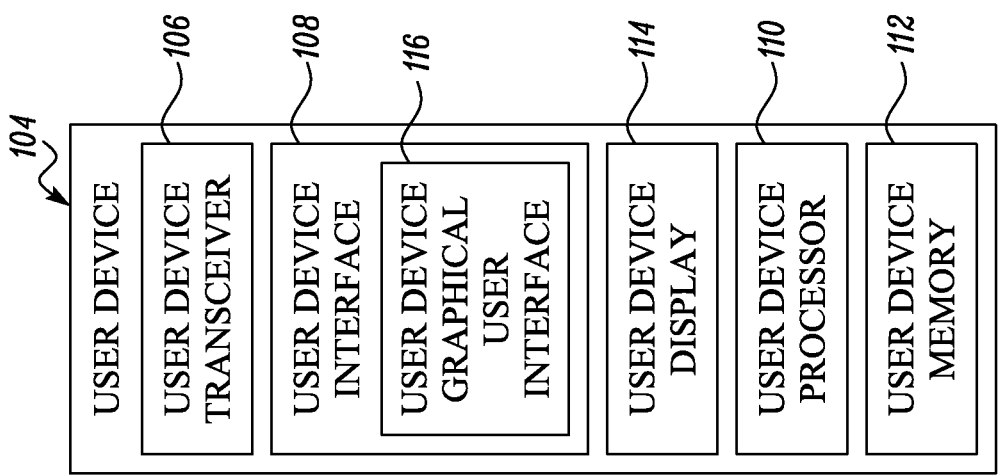
FIG. 2 illustrates a block diagram of an exemplary user device, in accordance with some embodiments.

It should be appreciated by those of ordinary skill in the art that FIG. 2 depicts the user device 104 in a simplified manner and a practical embodiment may include additional components and suitably configured logic to support known or conventional operating features that are not described in detail herein. It will further be appreciated by those of ordinary skill in the art that the user device 104 is a personal computer, desktop computer, tablet, smartphone, or any other computing device now known or developed in the future. It will further be appreciated by those of ordinary skill in the art that the user device 104 alternatively may function within a remote server, cloud computing device, or any other local or remote computing mechanism now known or developed in the future. Although the user device 104 is shown and described to be implemented within a single computing device, it may be contemplated that the one or more components of the user device 104 may alternatively be implemented in a distributed computing environment.

The user device 104 includes, among other components, a user device transceiver 106, a user device interface 108, a user device display 114, a user device processor 110, and a user device memory 112. The components of the user device 104, including the user device transceiver 106, the user device interface 108, the user device display 114, the user device processor 110, and the user device memory 112, cooperate with one another to enable operations of the user device 104. Each component may communicate with one another via a local interface (not shown). The local interface may be, such as, but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

As illustrated, the user device 104 in the exemplary embodiment includes the user device transceiver 106 to provide the one or more inputs to and receive the one or more outputs from other devices, such as, the system 102. The user device transceiver 106 includes a transmitter circuitry and a receiver circuitry to enable the user device 104 to communicate data to and acquire data from the system 102. In this regard, the transmitter circuitry includes appropriate circuitry to provide the one or more inputs, such as, but not limited to, the plurality of presentation slide content and the soundtrack, to the system 102. Similarly, the receiver circuitry includes appropriate circuitry to receive the one or more outputs, such as, but not limited to, the synchronized presentation multimedia file and one or more instructions associated with the generation of the synchronized presentation multimedia file from the system 102. It will be appreciated by those of ordinary skill in the art that the user device 104 may include a single user device transceiver 106 as shown, or alternatively separate transmitting and receiving components, for example but not limited to, a transmitter, a transmitting antenna, a receiver, and a receiving antenna.

The user device interface 108 is configured to receive user input from and/or to provide system output to the user or to one or more devices or components. User input may be provided via a keyboard, a touch screen display (such as, the user device display 114), a camera, a touch pad, a microphone, a recorder, a mouse or any other user input mechanism now known or developed in the future. System output may be provided via a display device, such as the user device display 114, speakers, a speaker, a haptic output, or any other output mechanism now known or developed in the future. The user device interface 108 may further include a serial port, a parallel port, an infrared (IR) interface, a universal serial bus (USB) interface and/or any other interface herein known or developed in the future.

In some embodiments, the user device interface 108 includes a user device graphical user interface 116 through which the user communicates to and from the system 102. The user device graphical user interface 116 may be an application or web portal or any other suitable interface to generate the synchronized presentation multimedia file now known or developed in the future. The user device graphical user interface 116 includes one or more of graphical elements associated with the generation of the synchronized presentation multimedia file. The graphical elements may include, but not limited to one or more of graphical icons, control buttons, timelines, selection boxes, progress indicators, pull-down menus, on-off checkmarks, scroll bars, windows, window edges, toggle buttons, and/or forms. The graphical elements may be used in conjunction with text to prompt the user for an input, respond to user actions, or display information to the user in response to the one or more instructions from the system 102.

The user device display 114 is configured to display data, images, and the like. The user device display 114 includes a display screen or a computer monitor now known or in the future developed. In accordance with some embodiments, the user device display 114 is configured to display the user device graphical user interface 116 associated with the generation of the synchronized presentation multimedia file.

The user device memory 112 is a non-transitory memory configured to store a set of instructions that are executable by the user device processor 110 to perform predetermined operations. For example, the user device memory 112 may include any of the volatile memory elements (for example, random access memory (RAM), nonvolatile memory elements (for example, read only memory (ROM), and combinations thereof. Moreover, the user device memory 112 may incorporate electronic, magnetic, optical, and/or other types of storage media. In some embodiments, the user device memory 112 is also configured to store files, such as but not limited to, the plurality of presentation slide content, the soundtrack, and the synchronized presentation multimedia file.

The user device processor 110 is configured to execute the instructions stored in the user device memory 112 to perform the predetermined operations, for example, the detailed functions of the user device 104 as will be described hereinafter. The user device processor 110 may include one or more microprocessors, microcontrollers, DSPs (digital signal processors), state machines, logic circuitry, or any other device or devices that process information or signals based on operational or programming instructions. The user device processor 110 may be implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The user device processor 110 is configured to cooperate with other components of the user device 104 to perform operations pursuant to communications and the one or more instructions from the system 102.

Referring back to FIG. 1, the system 102, the system 102 is configured to obtain the plurality of presentation slide content and the soundtrack from the user device 104 and generate the synchronized presentation multimedia file. The system 102 may be electrically and/or communicatively connected to a variety of devices, such as, the user device 104. In some embodiments, the system 102 includes a plurality of electrical and electronic components, providing power, operational control, communication, and the like within the system 102. For example, the system 102 includes, among other things, a system transceiver 120, a system processor 124, and a system memory 126.

It should be appreciated by those of ordinary skill in the art that FIG. 1 depicts the system 102 in a simplified manner and a practical embodiment may include additional components and suitably configured logic to support known or conventional operating features that are not described in detail herein. It will further be appreciated by those of ordinary skill in the art that the system 102 may be a personal computer, desktop computer, tablet, smartphone, or any other computing device now known or developed in the future.

Further, although the system 102 is shown and described to be implemented within a single computing device, it may be contemplated that the one or more components of the system 102 may alternatively be implemented in a distributed computing environment, without deviating from the scope of the claimed subject matter. It will further be appreciated by those of ordinary skill in the art that the system 102 alternatively may function within a remote server, cloud computing device, or any other remote computing mechanism now known or developed in the future. Such as, the system 102 in some embodiments may be a cloud environment incorporating the operations of the system transceiver 120, the system processor 124, and the system memory 126, and various other operating modules to serve as a software as a service model for the user devices 104. In some embodiments, the system 102 and the user device 104 may be implemented in a single device to perform the operations of both the system 102 and the user device 104, as will be described hereinafter.

The components of the system 102, including the system transceiver 120, the system processor 124, and the system memory 126 may communicate with one another via a local interface (not shown). The local interface may be, namely, but not limited to, one or more buses or other wired or wireless connections, as is known in the art. The local interface may have additional elements, but not limited to, such as controllers, buffers (caches), drivers, repeaters, and receivers, among many others, to enable communications. Further, the local interface may include address, control, and/or data connections to enable appropriate communications among the aforementioned components.

The system transceiver 120 includes a transmitter circuitry and a receiver circuitry (not shown) to enable the system 102 to communicate data to and acquire data from other devices such as the user devices 104. In this regard, the transmitter circuitry may include appropriate circuitry to transmit data such as, but not limited to, the synchronized presentation multimedia files and the one or more instructions associated with the generation of the synchronized presentation multimedia file to the user devices 104. Similarly, the receiver circuitry may include appropriate circuitry to receive data such as, but not limited to, the plurality of presentation slide content and the soundtrack from the user devices 104. The transmitter circuitry and the receiver circuitry together form a wireless transceiver to enable wireless communication with the user device 104. It will be appreciated by those of ordinary skill in the art that the system 102 may include a single system transceiver 120 as shown, or alternatively separate transmitting and receiving components, for example but not limited to, a transmitter, a transmitting antenna, a receiver, and a receiving antenna.

The system memory 126 is a non-transitory memory configured to store a set of instructions that are executable by the system processor 124 to perform the predetermined operations. For example, the system memory 126 may include any of the volatile memory elements (for example, random access memory (RAM), nonvolatile memory elements (for example read only memory (ROM), and combinations thereof. Moreover, the system memory 126 may incorporate electronic, magnetic, optical, and/or other types of storage media. In some embodiments, the system memory 126 is also configured to store files, such as, but not limited to, the plurality of presentation slide content, the soundtrack, and the synchronized presentation multimedia file.

The system processor 124 is configured to execute the instructions stored in the system memory 126 to perform the predetermined operations, for example, the detailed functions of the system 102 as will be described hereinafter. The system processor 124 may include one or more microprocessors, microcontrollers, DSPs (digital signal processors), state machines, logic circuitry, or any other device or devices that process information or signals based on operational or programming instructions. The system processor 124 may be implemented using one or more controller technologies, such as Application Specific Integrated Circuit (ASIC), Reduced Instruction Set Computing (RISC) technology, Complex Instruction Set Computing (CISC) technology, or any other technology now known or in the future developed.

In operation, the system 102 is configured to obtain the plurality of presentation slide content. In an embodiment, the system 102 may transmit a request to the user device 104 to provide the plurality of presentation slide content to the system 102. In an exemplary embodiment, the request may also include one or more instructions to prompt the user, for example via one or more graphical elements on the user device graphical user interface 116, to provide the plurality of presentation slide content. Upon receiving the request, the user device 104 is configured to obtain the plurality of presentation slide content. In an exemplary embodiment, the user device 104 is configured to obtain the plurality of presentation slide content in response to the user selecting the one or more graphical elements on the user device graphical user interface 116. The user device 104 is further configured to provide the obtained plurality of presentation slide content to the system 102. In another embodiment, the system 102 is configured to receive a signal from the user device 104 notifying transmission of the plurality of presentation slide content from the user device 104 to the system 102. Upon receiving the signal, the system 102 is configured to obtain the plurality of presentation slide content from the user device 104. In accordance with various embodiments, the user device 104 is configured to obtain the plurality of presentation slide content from the user device memory 112, based on the selection of the user. In some embodiments, the user device 104 is configured to obtain the plurality of presentation slide content from other devices and store the obtained plurality of presentation slide content in the user device memory 112. In some other embodiments, the user device 104 is configured to obtain the plurality of presentation slide content from, for example, a presentation application, via which the presentation slide content is created and store the created plurality of presentation slide content in the user device memory 112. The user device 104 is further configured to provide the plurality of presentation slide content to the system 102.

In some embodiments, the plurality of presentation slide content is obtained in a predefined order. In accordance with various embodiments, the predefined order corresponds to a sequence for viewing the plurality of presentation slide content in the synchronized presentation multimedia file. In an embodiment, the system 102 may provide one or more instructions to the user device 104 to provide the plurality of presentation slide content in the predefined order to the system 102. For example, in an embodiment, the one or more instructions may include instructions to prompt the user, for example, via one or more graphical elements on the user device graphical user interface 116, to provide the plurality of presentation slide content in the predefined order. Upon receiving the instructions, the user device 104 is configured to obtain the plurality of presentation slide content arranged in the predefined order. In some embodiments, the user device 104 may obtain the plurality of presentation slide content arranged in the predefined order from the presentation application, on which the presentation slide content is arranged in the predefined order. In some embodiments, the user device 104 is configured to obtain the plurality of presentation slide content arranged in the predefined order from other devices. The obtained plurality of presentation slide content arranged in the predefined order may be stored in the user device memory 112. The user device 104 is configured to obtain the plurality of presentation slide content arranged in the predefined order from the user device memory 112 based on inputs from the user. The user device 104 is further configured to transmit the plurality of presentation slide content arranged in the predefined order to the system 102. In another embodiment, the system 102 is configured to receive a signal from the user device 104 notifying transmission of the plurality of presentation slide content arranged in the predefined media order from the user device 104 to the system 102. Upon receiving the signal, the system 102 is configured to obtain the plurality of presentation slide content arranged in the predefined media order from the user device 104. In some embodiments, the system 102 is configured to provide one or more instructions to the user device 104 to display one or more of the obtained plurality of presentation slide content in the predefined order on the user device graphical user interface 116 of the user device 104.

In accordance with various embodiments, each of the plurality of presentation slide content is associated with a metadata representing unique identification of the corresponding presentation slide content. For instance, the metadata includes, but is not limited to, a serial number, a content number, a slide number, and/or any unique identification, of the corresponding presentation slide content. In accordance with some embodiments, the system 102 is configured to obtain the metadata corresponding to each of the plurality of presentation slide content from the user device 104. To this end, the system 102 may provide a request to the user device 104 to provide the metadata corresponding to each of the plurality of presentation slide content. Upon receiving the request, the user device 104 is configured to obtain the metadata corresponding to each of the plurality of presentation slide content from the user device memory 112. In another embodiment, the system 102 is configured to receive a signal from the user device 104 notifying transmission of the metadata corresponding to each of the plurality of presentation slide content from the user device 104 to the system 102. Upon receiving the signal, the system 102 is configured to obtain the metadata corresponding to each of the plurality of presentation slide content from the user device 104.

In accordance with some embodiments, the user device 104 is configured to obtain the metadata corresponding to each of the plurality of presentation slide content from the presentation application, when the plurality of presentation slide content is created using the presentation application. In such cases, the user device 104, for example, the presentation application, is configured to generate the metadata corresponding to each of the plurality of presentation slide content. In some other embodiments, the user device 104 is configured to receive the metadata corresponding to each of the plurality of presentation slide content from other devices, when the plurality of presentation slide content is received by the user device 104 from the other device. The received metadata is then stored in the user device memory 112. The user device 104 is configured to obtain the metadata corresponding to each of the plurality of presentation slide content from the user device memory 112. The user device 104 is further configured to transmit the metadata corresponding to each of the plurality of presentation slide content to the system 102.

Although not described in detail, it will be appreciated that the system 102 may be configured to obtain the plurality of presentation slide content and the associated metadata from two or more user devices 104 to enable the respective two or more users to collaborate for creation of the synchronized presentation multimedia file. For example, a first set of plurality of presentation slide content and the metadata corresponding to the first set of plurality of presentation slide content may be obtained from a first user device 104-1 and a second set of set of plurality of presentation slide content and the metadata corresponding to the second set of set of plurality of presentation slide content may be obtained from a second user device 104-2.

The system 102 is configured to obtain the soundtrack including a plurality of audio samples from the user device 104. In accordance with various embodiment, each audio sample may correspond to a unique portion of the soundtrack. In an embodiment, the system 102 may transmit a request to the user device 104 to provide the soundtrack to the system 102. In an exemplary embodiment, the request may also include one or more instructions to prompt the user, for example, via one or more graphical elements on the user device graphical user interface 116, to provide the soundtrack. Upon receiving the request, the user device 104 is configured to obtain the soundtrack from the user. In an exemplary embodiment, the user device 104 is configured to obtain the soundtrack when the user selects the one or more graphical elements on the user device graphical user interface 116. In another embodiment, the system 102 is configured to receive a signal from the user device 104 notifying transmission of the one or more soundtracks from the user device 104 to the system 102. Upon receiving the signal, the system 102 is configured to obtain the one or more soundtracks from the user device 104. In an embodiment, the system 102 is configured to receive one or more music tracks to merge the received one or more music tracks with the obtained soundtrack.

In some embodiments, the user device 104 is configured to record the soundtrack. To this end, the system 102 is configured to instruct the user device 104 to display one or more graphical elements on the user device graphical user interface 116 to determine whether the user chooses to record the soundtrack. The system 102 is configured to determine that the user chooses to record the soundtrack, when the user selects the displayed one or more graphical elements on the user device graphical user interface 116. Upon receiving the selection, in various embodiments, the system 102 is configured to instruct the user device 104 to allow the user to record the soundtrack via one or more user device interface 108, for example, via a microphone or an audio recorder within or communicatively coupled to the user device 104. In accordance with some embodiments, the recording of the soundtrack may be performed using a teleprompter. To this end, the system 102 may provide one or more instructions to the user device 104 to prompt the user, for example, via one or more graphical elements on the user device graphical user interface 116, to import a text file comprising narration for the soundtrack. Upon receiving the request, the user device 104 is configured to import the text file, for example, stored in the user device memory 112. In an exemplary embodiment, the user device 104 is configured to import the text file when the user selects the one or more graphical elements on the user device graphical user interface 116. In an exemplary embodiment, the imported text file is displayed via one or more graphical elements such as a teleprompter on the user device graphical user interface 116. The system 102 is configured to instruct the user device 104 via one or more graphical elements on the user device graphical user interface 116 to record the narration displayed on the teleprompter via the microphone or the recorder within or communicatively coupled to the user device 104. In accordance with an embodiment, the system 102 is configured to provide one or more instructions to the user device 104 to re-record the narration, via one or more graphical elements if the user chooses to re-record a portion of the narration. Upon receiving the one or more instructions, the user device 104 allows the user to re-record the portion of the narration. In yet some other embodiments, the user device 104 is configured to obtain the soundtrack from other devices. In the above discussed cases, the user device 104 is configured to store the soundtrack in the user device memory 112. The user device 104 is configured to obtain the soundtrack from the user device memory 112, based on the selection of the user and provide the obtained soundtrack to the system 102. In some embodiments, the obtained soundtrack may include multiple soundtracks mixed together. In some embodiments, the system 102 is configured to provide one or more instructions to the user device 104 to display a waveform associated with the obtained soundtrack on the user device graphical user interface 116 of the user device 104.

In accordance with various embodiments, each of the plurality of audio samples is indexed with a corresponding timecode. The timecode may be any standard timecode, such as Society of Motion Picture and Television Engineers (SMPTE) time code or the like. In some embodiments, the system 102 is configured to obtain the timecode associated with each audio sample from the user device 104. In an embodiment, the system 102 may provide a request to the user device 104 to provide the timecode associated with each audio sample to the system 102. In another embodiment, the system 102 is configured to receive a signal from the user device 104 notifying transmission of the timecode associated with each audio sample from the user device 104 to the system 102. Upon receiving the signal, the system 102 is configured to obtain the timecode associated with each audio sample from the user device 104. In accordance with some embodiments, when the user device 104 records the soundtrack, the user device 104 is configured to index each audio sample of the soundtrack with the timecode. In some other embodiments, when the user device 104 receives the soundtrack from other devices, the user device 104 is configured to receive the indexed timecode corresponding to each audio sample. In both cases, the user device 104 is configured to store the indexed timecodes in the user device memory 112. The user device 104 is further configured to obtain the timecode associated with each audio sample from the user device memory 112 and transmit the timecode to the system 102.

The system 102 is further configured to detect a triggering event identifying an audio sample from the plurality of audio samples of the soundtrack to transition from a first presentation slide content to a second presentation slide content of the plurality of presentation slide content. In accordance with an embodiment, the triggering event may include one or more textual marks in a transcribed text file of the soundtrack provided by the user. In some other embodiments, the triggering event may include one of a mouse click, a key press, a screen touch, or any trigger now known or developed in the future.

In accordance with an embodiment, the system 102 is configured to transmit one or more instructions to the user device 104 to determine whether the user chooses to add the one or more textual marks in the transcribed text file of the soundtrack. In particular, the one or more instructions may include instructions to display one or more graphical elements on the user device graphical user interface 116 to determine whether the user chooses to add the one or more textual marks in the transcribed text file of the soundtrack. The system 102 is configured to determine that the user chooses to add the one or more textual marks in the transcribed text file, when the user selects the displayed one or more graphical elements on the user device graphical user interface 116.

Upon receiving the selection, the system 102, for example, via the system processor 124, is configured to transcribe the obtained soundtrack into a text file, to obtain the transcribed text file of the soundtrack. The system 102 is configured to instruct the user device 104 to display the transcribed text file on the user device graphical user interface 116. In accordance with an embodiment, the system 102 may provide one or more instructions to the user device 104 to prompt the user, for example, via one or more graphical elements, on the user device graphical user interface 116, to add one or more textual marks in the displayed transcribed text file. The one or more textual marks may be any textual symbol or a special character, including but not limited to, an asterisk (*), an exclamation mark (!), a hash (#) or any other mark now know or in the future developed. Upon receiving the one or more instructions, the user device 104 is configured to prompt the user, via the one or more graphical elements on the user device graphical user interface 116, to add the one or more textual marks in the transcribed text file. In some embodiments, the user device 104 is configured to enable the user to add the one or more textual marks, for example, via the user device interface 108. The user device 104 is configured to transmit the transcribed text file having the one or more textual marks to the system 102.

In accordance with various embodiments, the system 102 is configured to consider the addition of one or more textual marks in the transcribed text file as a trigger that the user chooses to initiate the synchronization process (as described in detail hereinafter) of synchronizing the plurality of presentation slide content with the soundtrack. To this end, the system 102 is configured to detect the triggering event, identifying an audio sample from the plurality of audio samples of the soundtrack, to transition from a first presentation slide content to a second presentation slide content of the plurality of presentation slide content. In accordance with the various embodiments, the system 102 is considered to identify the first presentation slide content and the second presentation slide content based on the stage of the synchronization process, as described in detail hereinafter. For example, at the start of the synchronization process, the first presentation slide content may correspond to a presentation slide content arranged at a first position in the predefined order and the second presentation slide content may be a subsequent presentation slide content at a second position in the predefined order.

In accordance with various embodiments, the one or more textual marks in the transcribed text file is added in proximity to a word in the transcribed text file, where the user chooses to transition from the first presentation slide content to the second presentation slide content. In an exemplary embodiment, the one or more textual marks may be added before a word in the transcribed text file to indicate the transition from the first presentation slide content to the second presentation slide content. In yet another embodiment the one or more textual marks may be added after a word in the transcribed text file to indicate the transition from the first presentation slide content to the second presentation slide content. The system 102 is further configured to identify an audio sample of the soundtrack corresponding to the word (in proximity to which the one or more textual marks has been added) in the transcribed text file. In an exemplary embodiment, the system 102 may be configured to identify the audio sample based on the transcribed text file of the soundtrack and the soundtrack. For example, the system 102 may be configured to superimpose the transcribed text file over the waveform of the soundtrack such that each word in the transcribed text file is superimposed on the corresponding audio section of the soundtrack. The system 102 is configured to identify an audio sample corresponding to the position of the one or more textual marks in the superimposed file as the audio sample to the transition from the first presentation slide content to the second presentation slide content. In accordance with various embodiments, the system 102 is configured to identify the audio samples corresponding to each textual mark in the transcribed text file. In an exemplary embodiment, the system 102 is configured to store the timecode of the identified audio sample corresponding to the one or more textual marks.

In an exemplary embodiment, at the start of the synchronization process, when the system 102 obtains the transcribed text file having the one or more textual marks, the system 102 is configured to detect a first textual mark in the transcribed text file and identify the first textual mark as a first triggering event to transition from the presentation slide content arranged at the first position in the predefined order (the first presentation slide content, in this case) to the presentation slide content arranged at the second position in the predefined order (the second presentation slide content, in this case). To this end, the system 102 is configured to identify a first audio sample, for example, audio sample one ("1"), in the soundtrack corresponding to the position of the first textual mark in the superimposed file as the audio sample to the transition from the presentation slide content arranged at the first position in the predefined order (the first presentation slide content, in this case) to the presentation slide content arranged at the second position in the predefined order (the second presentation slide content, in this case).

The system 102 is further configured to detect a second textual mark in the transcribed text file and identify the second textual mark as a second triggering event. At this stage, the system 102 is configured to identify the first presentation slide content as the presentation slide content arranged at the second position in the predefined order and the second presentation slide content as a presentation slide content arranged at the third position in the predefined media order. The system 102 is configured to detect the second triggering event as a trigger to transition from the presentation slide content arranged at the second position in the predefined order (the first presentation slide content, in this case) to the presentation slide content arranged at the third position in the predefined order (the second presentation slide content, in this case). The system 102 is configured to identify a second audio sample, for example, audio sample two ("2"), in the soundtrack corresponding to the position of the second textual mark in the superimposed file as the audio sample to the transition from the presentation slide content arranged at the second position in the predefined order (the first presentation slide content, in this case) to the presentation slide content arranged at the third position in the predefined order (the second presentation slide content, in this case). In accordance with various embodiments, the system 102 is configured to perform the above step until audio samples corresponding to each textual mark in the transcribed text file are identified.

In some embodiments, the system 102 is configured to receive one or more edits to the transcribed text file associated with the soundtrack, for example, via the system transceiver 120. The one or more edits may correspond to one or more of deleting one or more textual marks, adding one or more textual marks, deleting or adding extra spaces in the transcribed text file, deleting extra words in the transcribed text file, or the like. To this end, the system 102 is configured to provide one or more instructions to the user device 104 to allow the user to edit transcribed text file on the user device 104, in particular, via one or more graphical elements. For example, the system 102 may instruct the user device 104 to display the transcribed text file, via the system graphical user interface 118 to enable the user to edit the transcribed text file. Upon receiving the instructions, the user device 104 is configured to receive the one or more edits to the transcribed text file from the user for example, via the user device graphical user interface 116. Upon receiving the one or more edits, the user device 104 is further configured to transmit the transcribed text file reflecting the one or more edits, to the system 102. In an embodiment, the system 102 is configured to replace the transcribed file with the updated transcribed file in the plurality of presentation slide content saved in the system memory 126, to reflect the received one or more edits. The system 102 is further configured to instruct the user device 104 to display the updated transcribed file to the user.

In some other embodiments, the system 102 is configured to detect the triggering event in real time identifying an audio sample from the plurality of audio samples of the soundtrack to transition from the first presentation slide content to the second presentation slide content of the plurality of presentation slide content, while the soundtrack is being played. In such cases, the triggering event may include one of a mouse click, a key press, a screen touch, or the like, while the soundtrack is being played. To this end, the system 102 is configured to determine whether a soundtrack is being played on the user device 104. In some embodiments, the system 102 is configured to communicate with the user device 104 to determine whether the soundtrack is being played on the user device 104. In an exemplary embodiment, the system 102 is configured to instruct the user device 104 to provide user request associated with the playback of the soundtrack to the system 102. In accordance with various embodiments, the user request may include selection of one or more graphical elements, on the user device graphical user interface 116, associated with the playback of the soundtrack. Upon receiving the user request, the user device 104 is configured to provide the user request to the system 102. The system 102 is then configured to control the user device 104 to play the soundtrack, for example, via the speaker within or communicatively coupled to the user device 104. In accordance with various embodiments, the system 102 is configured to communicate with the user device 104 to determine that the soundtrack is being played when the user device 104 starts playing the soundtrack.

In such cases, the system 102 is configured to consider the user request to play the soundtrack as a trigger that the user chooses to initiate the synchronization process. To this end, the system 102 is configured to instruct the user device 104 to display one or more presentation slide content, from the plurality of presentation slide content, for example, via the user device graphical user interface 116 on the user device 104, when the soundtrack is being played. In an exemplary embodiment, the one or more presentation slide content may include the first presentation slide content and the second presentation slide content. As discussed above, the system 102 is considered to identify the first presentation slide content and the second presentation slide content based on the stage of the synchronization process.

In an exemplary embodiment, at the start of the synchronization process, when the first presentation slide content corresponds to the file arranged at the first position in the predefined order and the second presentation slide content corresponds to the subsequent file arranged at the second position in the predefined order, the system 102 is configured to detect a first triggering event as a trigger to transition from the presentation slide content arranged at the first position in the predefined order (the first presentation slide content, in this case) to the presentation slide content arranged at the second position in the predefined order (the second presentation slide content, in this case). To this end, the system 102 is configured to identify a first audio sample, for example, audio sample one ("1"), in the soundtrack that is being played at the time of receiving the first triggering event as an audio sample to the transition from the presentation slide content arranged at the first position in the predefined order (the first presentation slide content, in this case) to the presentation slide content arranged at the second position in the predefined order (the second presentation slide content, in this case).

The system 102 is further configured to detect a second triggering event while the soundtrack is being played. At this stage, the system 102 is configured to identify the first presentation slide content as the presentation slide content arranged at the second position in the predefined order and the second presentation slide content as a presentation slide content arranged at the third position in the predefined media order. The system 102 is then configured to detect the second triggering event as a trigger to transition from the presentation slide content arranged at the second position in the predefined order (the first presentation slide content, in this case) to the presentation slide content arranged at the third position in the predefined order (the second presentation slide content, in this case). The system 102 is configured to identify a second audio sample, for example, audio sample two ("2"), in the soundtrack that was being played at the time of receiving the second triggering event as an audio sample to the transition from the presentation slide content arranged at the second position in the predefined order (the first presentation slide content, in this case) to the presentation slide content arranged at the third position in the predefined order (the second presentation slide content, in this case). In accordance with various embodiments, the system 102 is configured to perform the above step until audio samples corresponding to each triggering event are identified.

In accordance with various embodiments, the system 102, for example, via the system processor 124 is configured to obtain the timecode indexed with the identified audio sample of the soundtrack corresponding to the detected triggering event. The system 102 is also configured to obtain the metadata of the second presentation slide content displayed on the user device 104 when the triggering event is detected. In particular, the system 102 may be configured to obtain the timecode indexed with the identified audio sample and the metadata of the second presentation slide content from the system memory 126. In accordance with various embodiments, the system 102, for example, via the system processor 124, is configured to associate the obtained timecode with the metadata of the second presentation slide content to link the second presentation slide content with the identified audio sample. In an embodiment, the system 102 is configured to associate the obtained timecode with the metadata of the second presentation slide content by reading the obtained timecode and writing the metadata, for example, the slide number, directly on to the obtained timecode. In some embodiments, the system 102 is configured to store the association in the system memory 126. In accordance with some embodiments, the system 102 is configured to associate the obtained timecode with the metadata of the second presentation slide content periodically at predefined intervals, upon detection of the triggering event.

In accordance with various embodiments, the system 102 is configured to receive input to manually adjust the obtained timecode. To this end, the system 102 is configured to determine whether the user chooses to manually adjust the obtained timecode. For example, the system 102 is configured to instruct the user device 104 to display one or more graphical elements on the user device graphical user interface 116 to determine whether the user chooses to manually adjust the obtained timecode. In an exemplary embodiment, the system 102 is configured to determine that the user chooses to manually adjust the obtained timecode, when the user selects the displayed one or more graphical elements on the user device graphical user interface 116.

Upon receiving the selection, in various embodiments, the system 102 is configured to instruct the user device 104 to receive inputs from the user for manually adjusting the obtained timecode, via one or more graphical elements on the user device graphical user interface 116. For instance, upon receiving the instructions the user device 104 is configured to allow the user to adjust the time code by manually dragging a playhead over the timeline of the soundtrack, in an audio/video editor window. The user device 104 is further configured to transmit the adjusted timecodes to the system 102. In an embodiment, the system 102 is configured to replace the obtained timecode with the manually adjusted timecode saved in the system memory 126, to reflect the received adjustments and further to update the associations. The system 102 is further configured to instruct the user device 104 to display the adjusted timecodes to the user via the graphical user interface.

In an exemplary embodiment, the system 102 such as, via the system processor 124 is configured to generate the synchronized presentation multimedia file having the linked second presentation slide content with the identified audio sample. In accordance with various embodiments, the generated synchronized presentation multimedia file links or associates the metadata of the second presentation slide content with the timecode of the identified audio sample such that the second presentation slide content is displayed when the identified audio sample is played and vice-versa, during the replay of the synchronized presentation multimedia file. The system 102 is configured to transmit the generated synchronized presentation multimedia file to one or more user devices 104. Upon receiving the synchronized presentation multimedia file, the user device 104 is configured to provide the user with an option, such as, via the user device graphical user interface 116, to play and/or store the received synchronized presentation multimedia file. In some embodiments, the user device 104 is also configured to transmit the received synchronized presentation multimedia file to other user devices 104, such as, via the user device transceiver 106. In some embodiments, the system 102 is configured to store the generated synchronized presentation multimedia file in a collaborative storage means such as, but not limited to, via cloud storage or a web portal or a social media account to enable the user to share the generated synchronized presentation multimedia file with other user devices 104.

In accordance with some embodiments, the system 102 is configured to receive one or more edits to the plurality of presentation slide content such as, via the system transceiver 120. The one or more edits to the plurality of presentation slide content may include, but are not limited to, editing text of the presentation slide, adding one or more presentation slides, deleting one or more presentation slides, changing the predefined order of the plurality of presentation slides, changing the order of presentation slide content, adding a new presentation slide content, deleting a presentation slide content, or the like.

To this end, in accordance with various embodiments, the system 102 is configured to determine whether the user chooses to edit the plurality of presentation slide content. In an exemplary embodiment, the system 102 is configured to instruct the user device 104 to display one or more graphical elements on the user device graphical user interface 116 to determine whether the user chooses to edit the plurality of presentation slide content. The system 102 is configured to determine that the user chooses to edit, when the user selects the displayed one or more graphical elements on the user device graphical user interface 116.

Upon receiving the selection, in various embodiments, the system 102 is configured to instruct the user device 104 to allow the user to edit the presentation slide content. For example, the user device 104 is configured to allow the user to make one or more edits via the presentation application. Upon receiving the one or more edits, the user device 104 is further configured to transmit the one or more presentation slide content reflecting the one or more edits, to the system 102. In an embodiment, the system 102 is configured to receive a signal from the user device 104 notifying transmission of the one or more edits to the plurality of presentation slide content from the user device 104 to the system 102. Upon receiving the signal, the system 102 is configured to obtain the one or more edits from the user device 104. In yet another embodiment, when two or more user devices 104 are collaborating for creation of the synchronized presentation multimedia file, the system 102 may be configured to receive the one or more edits from one or more of the two or more user devices 104.

In an embodiment, upon receiving the one or more edits, the system 102, is configured to replace the presentation slide content with the updated presentation slide content. In an exemplary embodiment, the system 102 is configured to replace the presentation slide content with the updated presentation slide content in the plurality of presentation slide content saved in the system memory 126, to reflect the received one or more edits. The system 102 is further configured to instruct the user device 104 to display the updated presentation slide content to the user.

In an embodiment, the system 102 is configured to transmit one or more instructions to the user device 104 to determine whether the user chooses to continue the synchronization process. For example, when the edits are made to the presentation slides that are not yet associated with any audio samples (for example, the second presentation slide), the user may choose to continue or resume the synchronization process. To this end, the system 102 is configured to instruct the user device 104 to display one or more graphical elements on the user device graphical user interface 116 to determine whether the user chooses to continue the synchronization process. In an exemplary embodiment, the system 102 is configured to determine that the user chooses to continue the synchronization process when the user selects the displayed one or more graphical elements on the user device graphical user interface 116.

The system 102 is further configured to detect a triggering event to associate the metadata of the replaced second presentation slide content with the timecode of the identified audio sample of the plurality of audio samples of the soundtrack. To this end, the system 102 is configured to communicate with the user device 104, to detect a further triggering event, which is a newly generated triggering event. For example, the system 102 is configured to instruct the user device 104, to detect the triggering event received by the user device 104 and communicate the detection to the system 102. The system 102 is then configured to identify an audio sample of the soundtrack when the further triggering event is detected. The system 102 then, for example via the system processor 124, is configured to obtain the timecode indexed with the identified audio sample of the soundtrack corresponding to the detected triggering event. The system 102 is also configured to obtain the metadata of the replaced second presentation slide content displayed on the user device 104 when the triggering event is detected. In some embodiments, the system 102 may be configured to obtain the timecode indexed with the identified audio sample and the metadata of the replaced second presentation slide content from the system memory 126. In accordance with various embodiments, the system 102, for example, via the system processor 124, is configured to associate the timecode of the identified audio sample with the metadata of the replaced second presentation slide content. In some embodiments, the system 102 is configured to store the association in the system memory 126.

In an embodiment, the system 102 is configured to transmit one or more instructions to the user device 104 to determine whether the user chooses to restart the synchronization process. For example, when the edits are made to the presentation slides that are already associated with an audio sample, the user may choose to restart the synchronization process. To this end, the system 102 is configured to instruct the user device 104 to display one or more graphical elements on the user device graphical user interface 116 to determine whether the user chooses to restart the synchronization process. In an exemplary embodiment, the system 102 is configured to detect the further triggering event and associate the metadata of the replaced presentation slide content with the timecode of the identified audio sample, in accordance with the process described above.

In various embodiments, the system 102 is configured to generate a synchronized presentation multimedia file for preview. The system 102 is configured to determine whether the user chooses to preview the synchronized presentation multimedia file. As, the system 102 is configured to instruct the user device 104 to display one or more graphical elements on the user device graphical user interface 116 to determine whether the user chooses to preview the synchronized presentation multimedia file. In an exemplary embodiment, the system 102 is configured to determine that the user chooses to preview, when the user selects the displayed one or more graphical elements on the user device graphical user interface 116.

Upon receiving the selection, in various embodiments, the system 102 is configured to instruct the user device 104 to play the synchronized multimedia presentation file. To this end, the system 102 is configured to display the first presentation slide and play the soundtrack from the beginning. The system 102 is further configured to track the timecode of each audio sample of the soundtrack, as the soundtrack is being played. The system 102 is configured to detect, for each timecode, if a timecode of the audio sample is associated with the metadata of any presentation slide content of the plurality of presentation slide content. The system 102 is further configured to instruct the user device 104 to display a presentation slide content via user device graphical user interface 116, when the timecode is determined to be associated with the metadata of the presentation slide content. The system 102 is configured to repeat the above-mentioned preview process for each audio sample.

In an exemplary embodiment, when the user chooses to preview from a particular portion of the synchronized multimedia presentation file, the user device 104 may allow the user to indicate the desired portion (such as the audio sample) of the soundtrack for example, but not limited to, by dragging the play head over the timeline of the soundtrack to the desired portion, or by moving the cursor to the desired portion. The system 102 is further configured to detect the audio sample and the associated timecode of the audio sample. The associated timecode of the desired portion is herein referred as a current timecode. The system 102 is further configured to determine when the current timecode is associated with the metadata of any presentation slide content. In one embodiment, when the system 102 determines that the current timecode is associated with the metadata of any presentation slide, then the system 102 instructs the user device 104 to display the presentation slide content with which the current timecode has been associated. Yet in another embodiment, when the system 102 determines that the current timecode is not associated with any presentation slide content, then the system 102 instructs the user device 104 to display the presentation slide content with metadata associated with a timecode prior to the current timecode.

Figure 3:
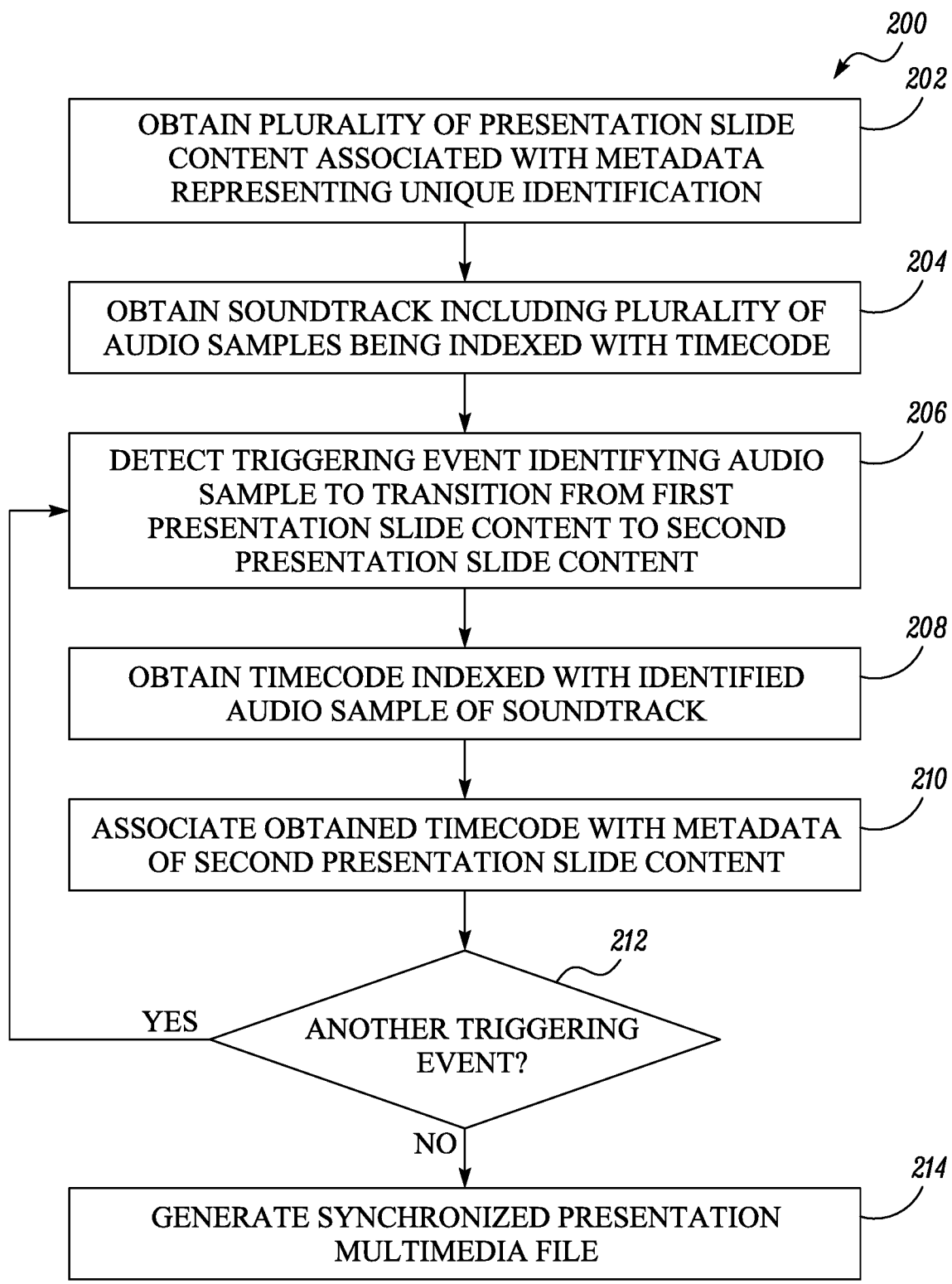
FIG. 3 illustrates an exemplary method for synchronizing the plurality of presentation slide content with the soundtrack, in accordance with some embodiments.

FIG. 3 illustrates an exemplary method 200 to synchronize the plurality of presentation slide content with the soundtrack. Initially, at operation 202, the method begins with the system 102 obtaining the plurality of presentation slide content arranged in the predefined order. In accordance with various embodiments, each presentation slide content is associated with the metadata representing a unique identification of the corresponding presentation slide content. At operation 204, the system 102 obtains the soundtrack including the plurality of audio samples indexed with corresponding timecodes. Further, at operation 206, the system 102 detects the triggering event that identifies an audio sample of the soundtrack as an audio sample to transition from the first presentation slide content to a second presentation slide content of the plurality of presentation slide content. At operation 208, the system 102 obtains the timecode indexed with the identified audio sample of the soundtrack corresponding to the detected triggering event. Further, at operation 210, the system 102 associates the obtained timecode with the metadata of the second presentation slide content to link the second presentation slide content with the identified audio sample. Further, at operation 212, the system 102 detects whether there is another triggering event. When the system 102 detects the other triggering event at 212, the system 102 returns to operation 206 and continue with the subsequent operations. At this stage, as discussed above, the first presentation slide content will correspond to a presentation slide at second position and the second presentation slide content will correspond to a presentation slide at the third position. When the system 102 does not detect any triggering event at 212, the system 102 proceeds to generate the synchronized presentation multimedia file having each of the presentation slide contents linked with the respective identified audio sample at 214.

Figure 4:
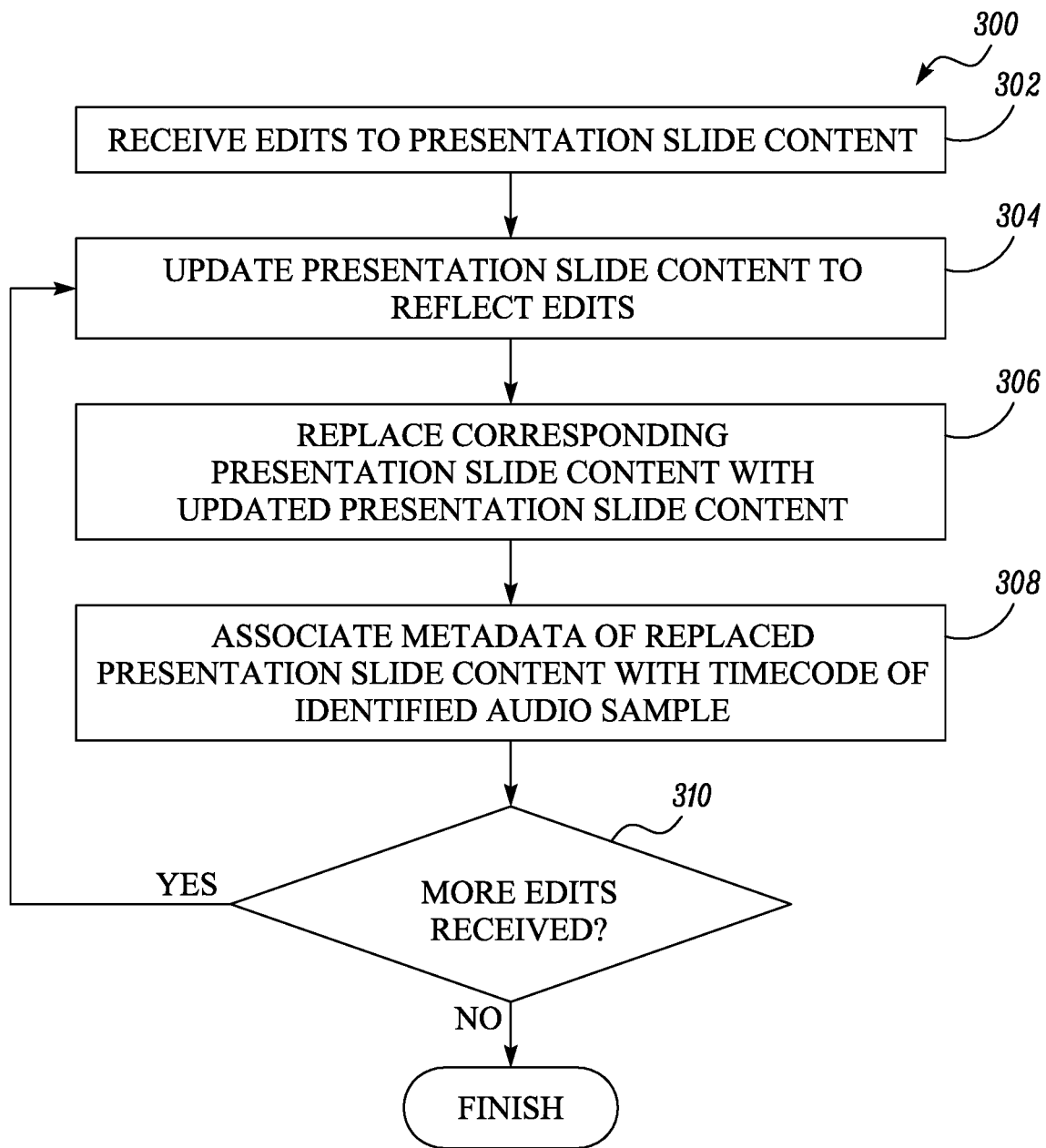
FIG. 4 illustrates an exemplary method for editing the plurality of presentation slide content, in accordance with some embodiments.

Further FIG. 4 illustrates an exemplary method 300 for editing a presentation multimedia file including a plurality of presentation slide content, in accordance with some embodiments. The method begins at operation 302 by the system 102 receiving one or more edits to a presentation slide content of the plurality of presentation slide content. At operation 304, the system 102 updates the presentation slide to reflect the received one or more edits. Further, at operation 306, the system 102 replaces the corresponding presentation slide content with the updated presentation slide content. In some embodiments, the system 102 receives a further triggering event to associate the metadata of the replaced presentation slide content with the timecode of the identified audio sample of the plurality of audio samples of the soundtrack. At operation 308, the system 102 associates the metadata of the replaced presentation slide content with the timecode of the identified audio sample. Further, at operation 310, the system 102 detects whether more edits are received for another presentation slide content. When the system 102 detects that more edits have been received at 310, the system 102 returns to operation 304 and continue with the subsequent operations. The system 102 keeps detecting until no further edits are received for the presentation slide contents of the plurality of presentation slide content.

FIGS. 5 through 9 illustrate exemplary implementations for synchronizing the plurality of presentation slide content with the soundtrack, in accordance with some embodiments. To this end, FIGS. 4 through 8 illustrate the user device graphical user interface 116 that is displayed on the user device display 114 of the user devices 104. As discussed hereinbefore, the system 102 is configured to communicate with the user via the user device graphical user interface 116.

Figure 5:
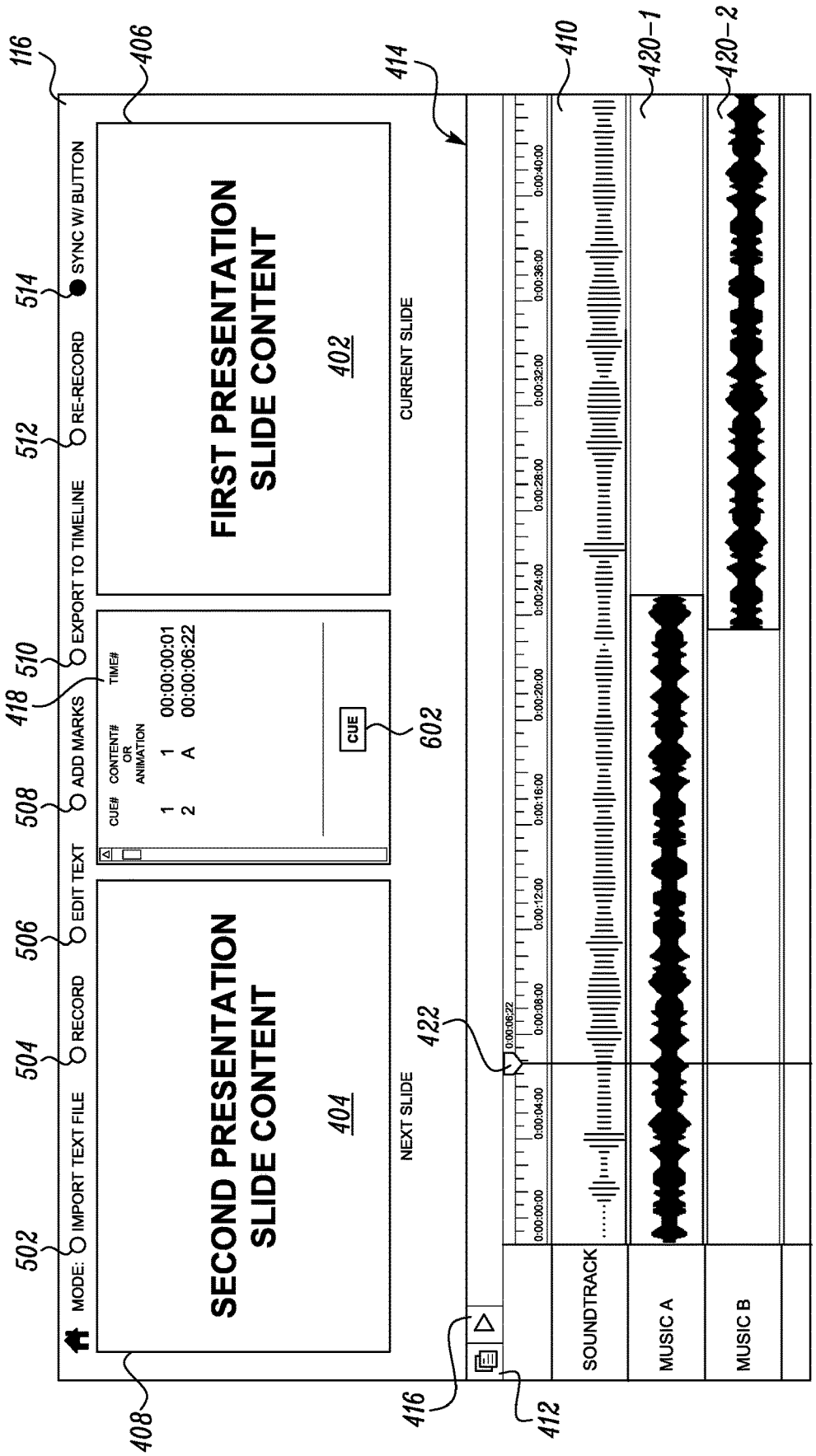
FIGS. 5 through 9 illustrate exemplary implementations for synchronizing the plurality of presentation slide content with the soundtrack, in accordance with some embodiments.

FIG. 5 illustrates the user device graphical user interface 116, for synchronizing the plurality of presentation slide content with the soundtrack when the triggering event may include one of a mouse click, a key press, a screen touch, or the like, while the soundtrack is being played. The system 102 allows the user to choose this method via the graphical element, such as, sync with button 514. During the synchronizing process, the system 102 displays the plurality of presentation slide content, such as, the first presentation slide content 402 in a current slide window 406 and the second presentation slide content 404 in a next slide window 408. The system 102 further receives a selection of the soundtrack, such as the soundtrack 410, via one or more graphical elements 412 and upon reception, displays the soundtrack 410 such as, in a window 414 along with the timecode. The system 102 enables the user to track or move to a particular timecode of the soundtrack using the play head 422. The system 102 associates a timecode of an audio sample being played with the metadata of the second presentation slide content 404, when the soundtrack is played via the graphical element 416. The system 102 displays the associations of the timecode and the presentation slide content in a control window 418. In an embodiment, the system 102 also adds additional music, such as but not limited to, music A 420-1 and music B 420-2 to the soundtrack 410.

Figure 6:
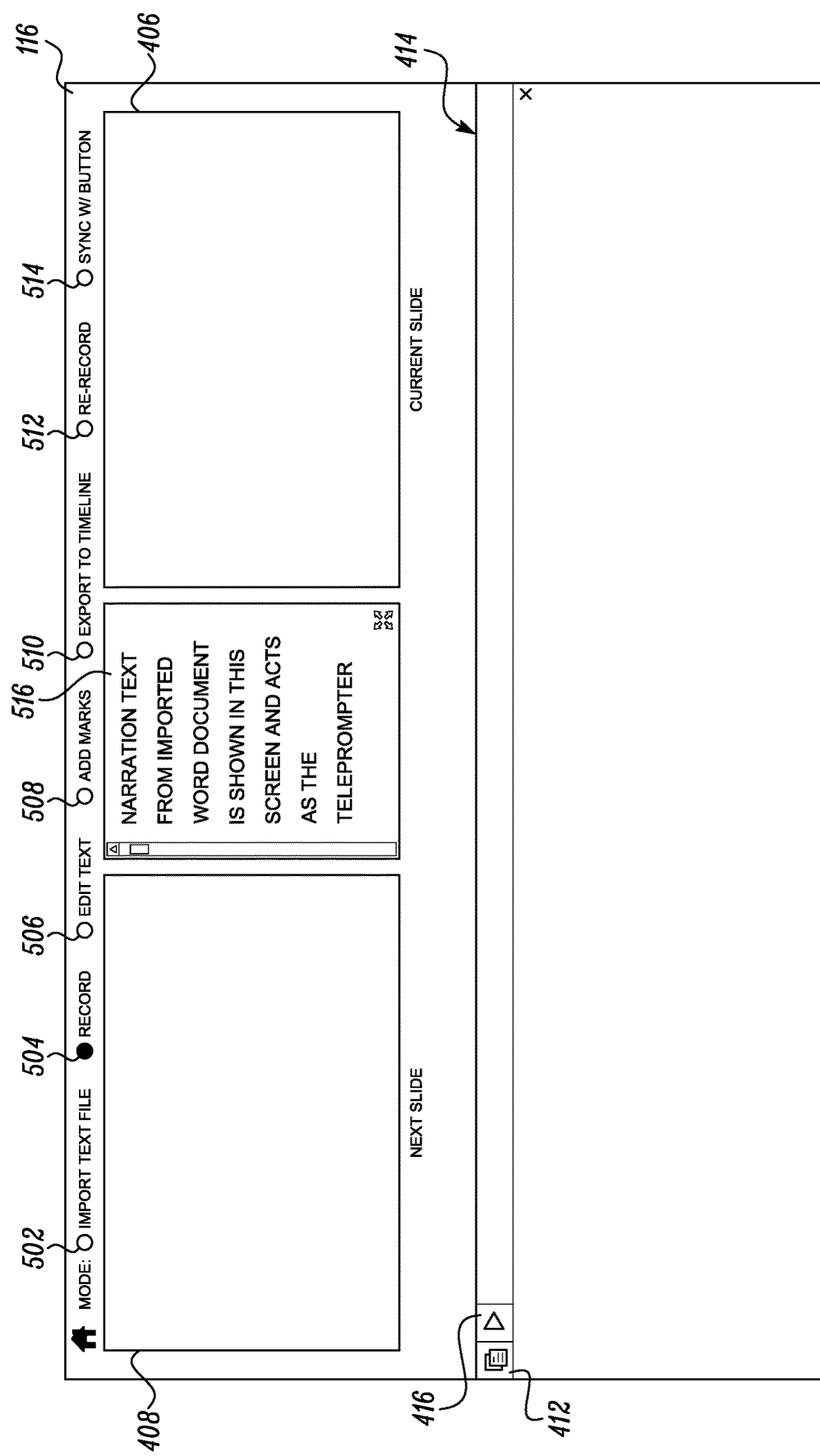

As illustrated in FIG. 6, the system 102 displays a plurality of graphical elements, such as but not limited to, a import text file 502, a record 504, a add marks 508, a re-record 512, and so on, to record the soundtrack and add one or more textual marks in the transcribed file of the soundtrack. In accordance with various embodiments, the system 102 imports the text file comprising the narration for recording the soundtrack, upon selection of the graphical element, import text file 502. In an exemplary embodiment, the system 102 instructs the user device 104 to display the imported text file via graphical element, like teleprompter 516. Further, the system 102 allows the user to record the soundtrack upon selection of the graphical element, such as, record 504. Further, the system 102 re-records the soundtrack upon selection of the graphical element, such as, re-record 512. The system 102 allows the user to edit the transcribed text file upon selection of the graphical element, such as, the edit text 506.

Figure 7:
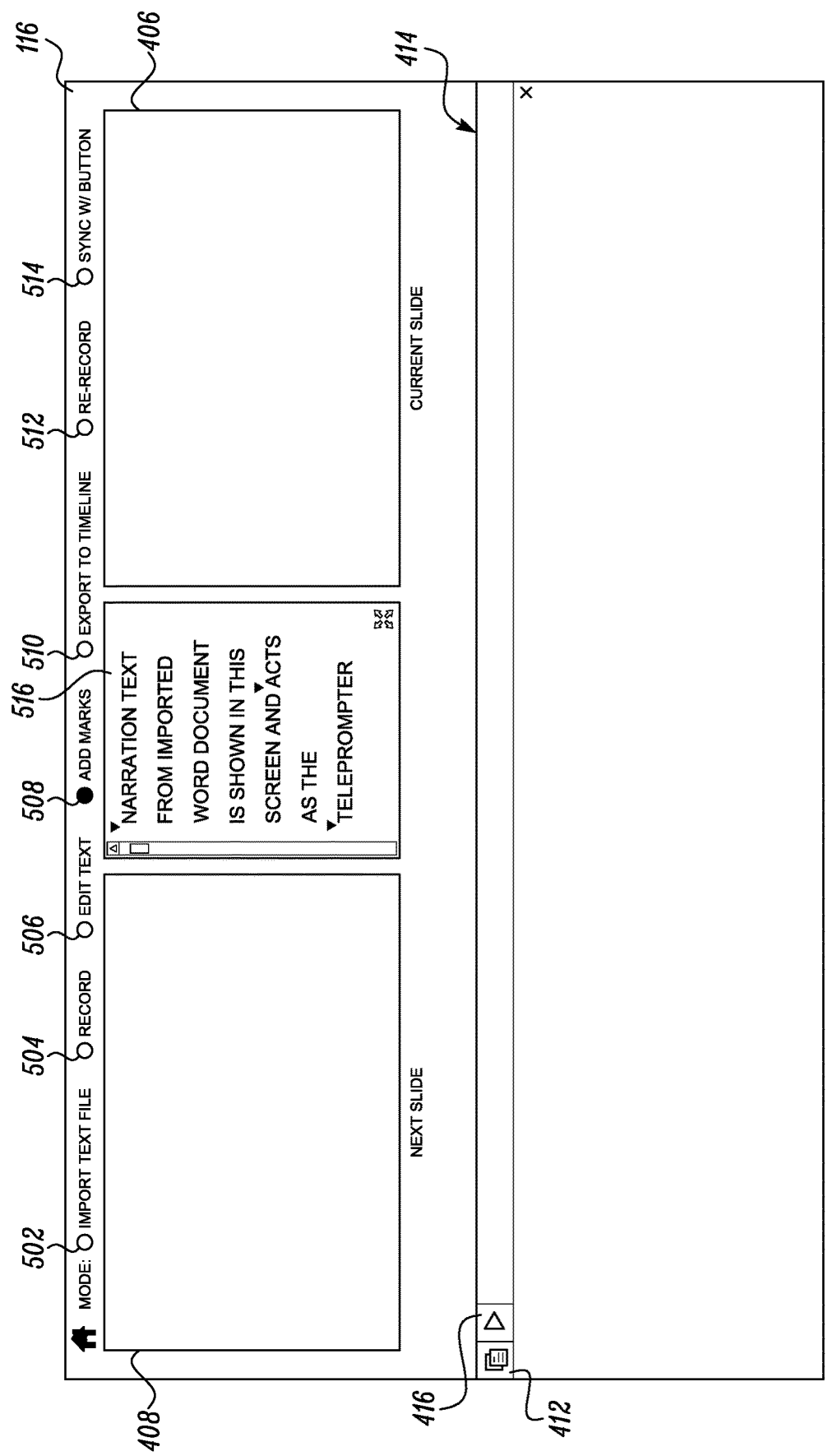
Figure 8:
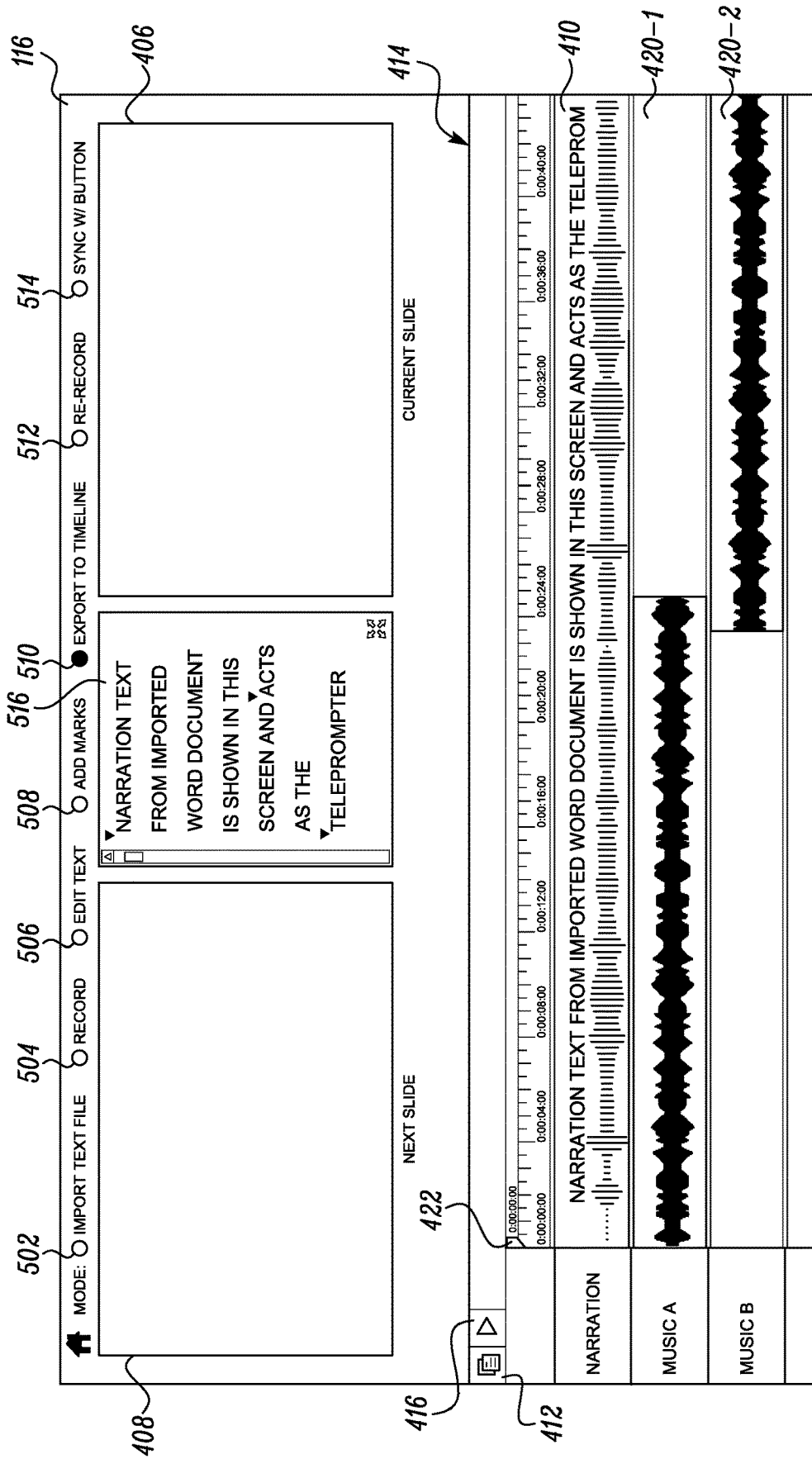
Figure 9:
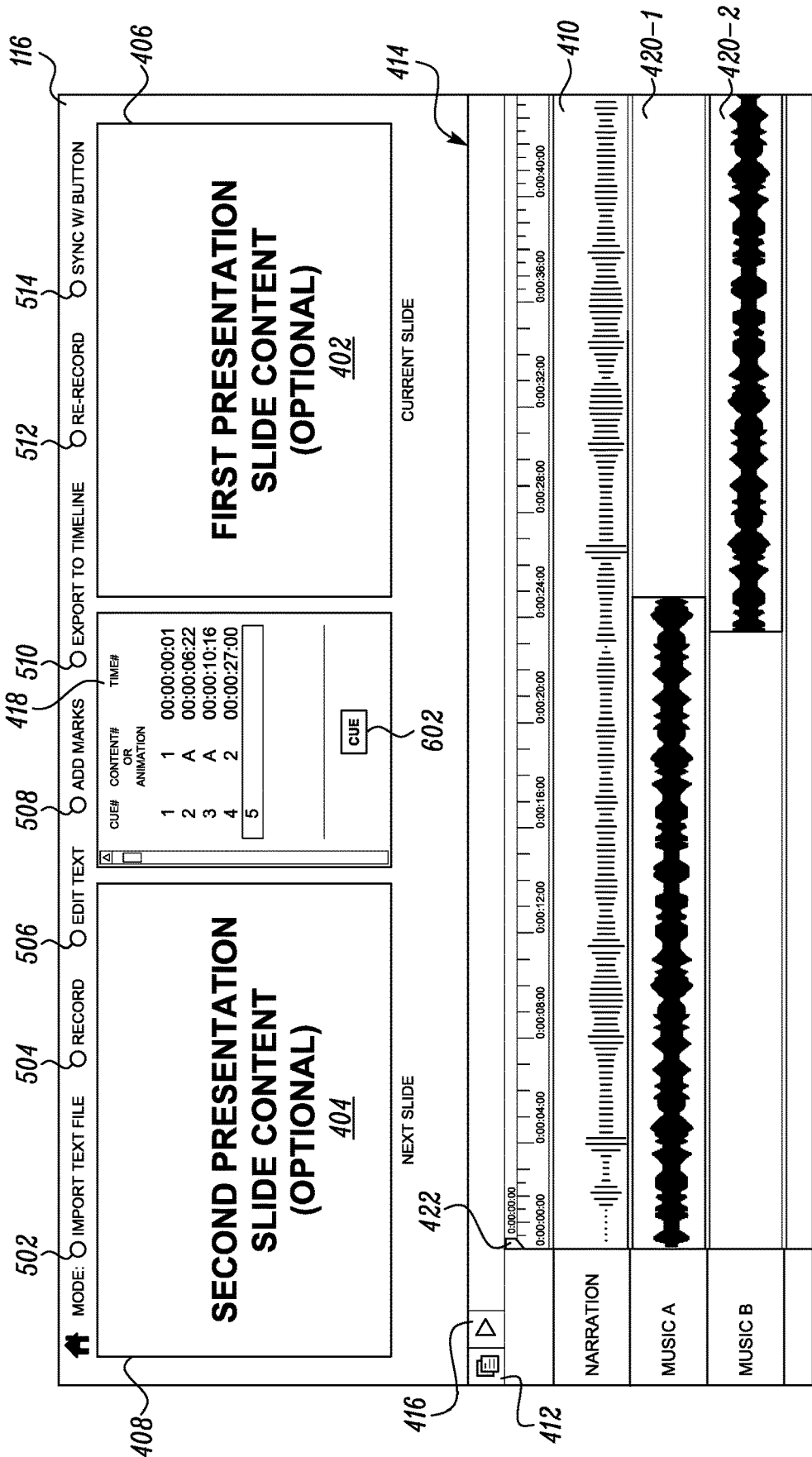

In accordance with various embodiments, the system 102 allows the user to add one or more textual marks in the transcribed text file upon selection of the graphical element, such as add marks 508, as illustrated in FIG. 7. Further, in some embodiments, the system 102 superimposes the transcribed text file over the waveform of the soundtrack, upon selection of the graphical element, such as, export to timeline 510, as illustrated in FIG. 8. In accordance with various embodiments, after the one or more textual marks are added in the transcribed text file, the system 102 associates the timecode corresponding to the textual marks with the metadata of presentation slide, upon selection of the graphical element, such as, cue 602, as illustrated in FIG. 9. The system 102 further displays the association in the control window 418, as illustrated in FIG. 9.

The system and the method of the present disclosure provide a simple and an efficient solution to synchronize the plurality of presentation slide content with the soundtrack to create the synchronized multimedia file. This disclosure provides different embodiments to allow easy and hassle-free generation of the synchronized multimedia file. By simply adding one or more textual marks over the words, the system allows the user to select exact location to trigger a change, thereby providing high resolution and accuracy to slide and/or animation changes. Also, synchronizing the presentation slide content by way of simple click provides an accurate and efficient way of synchronizing, as it allows the user to capture the exact desired audio sample to link with the presentation slide content in real time.

Moreover, the present disclosure provides a quick and faster way of synchronizing the presentation slides with the soundtrack. For example, with the embodiments of the present disclosure, a five-minute video with a hundred slides and as many animations can be synchronized in just few minutes. On the other hand, the synchronization process using conventional video editing systems takes hours or even days to perform the same task, due to the complexity of the conventional video editing systems. In addition, the present disclosure provides flexibility to the user to edit the plurality of presentation slide content even during the synchronization process. The user can easily make any change in the presentation slide content and can resume the synchronization process form where the synchronization process was paused, which cannot be achieved in the conventional editing systems.

In the hereinbefore specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A method for synchronizing a plurality of presentation slide content in a presentation slide with a soundtrack, the method comprising:
    obtaining the plurality of presentation slide content arranged in a predefined order in the presentation slide, each presentation slide content associated with a metadata representing unique identification of the corresponding presentation slide content, wherein the presentation slide content comprises a video in the presentation slide or an animation in the presentation slide;
    obtaining the soundtrack including a plurality of audio samples, each audio sample being indexed with a corresponding timecode;
    detecting a triggering event identifying an audio sample from the plurality of audio samples of the soundtrack to transition from a first presentation slide content to a second presentation slide content of the plurality of presentation slide content in the presentation slide;
    obtaining a timecode indexed with the identified audio sample of the soundtrack corresponding to the detected triggering event;
    associating the obtained timecode with the metadata of the second presentation slide content in the presentation slide to link the second presentation slide content in the presentation slide with the identified audio sample; and
    generating a synchronized presentation multimedia file having the linked second presentation slide content in the presentation slide with the identified audio sample.

2. The method of claim 1, wherein the triggering event includes one of a mouse click, a key press, a screen touch, or a textual mark in transcribed text file of the soundtrack.

3. The method of claim 1, wherein the triggering event is detected in real time while the soundtrack is being played to identify the audio sample from the plurality of audio samples of the soundtrack to transition from the first presentation slide content to the second presentation slide content in the presentation slide.

4. The method of claim 1, further comprising:
    transcribing the soundtrack into a text file,
    wherein detecting the triggering event comprises detecting a textual mark in the text file, the textual mark being added in proximity to a word associated with the audio sample to transition from the first presentation slide content to the second presentation slide content in the presentation slide.

5. The method of claim 4, wherein obtaining a timecode indexed with the identified audio sample of the soundtrack corresponding to the detected triggering event further comprises:
associating the transcribed text file with the timecode associated with the corresponding audio samples; and
obtaining the timecode associated with the detected textual mark in the text file based on the association.

6. The method of claim 4, further comprising:
receiving input indicating edits to the transcribed text file associated with the soundtrack; and
updating the corresponding soundtrack based on the received input.

7. The method of claim 1, further comprising:
receiving input to generate a synchronized presentation multimedia file for preview;
generating the synchronized presentation multimedia file for preview by:
detecting a current timecode associated with the soundtrack being played;
determining whether the current timecode is associated with metadata of any presentation slide content of the plurality of presentation slide content in the presentation slide; and
displaying the presentation slide content on a display when the current timecode is associated with metadata of a presentation slide content in the presentation slide.

8. The method of claim 1, further comprising:
receiving input to manually adjust the obtained timecode; and
updating the obtained timecode to reflect the manually adjusted timecode.

9. The method of claim 1, further comprising:
receiving one or more edits to the second presentation slide content of the plurality of presentation slide content in the presentation slide;
updating the second presentation slide content in the presentation slide to reflect the received one or more edits;
replacing the corresponding second presentation slide content in the obtained plurality of presentation slide content with the updated second presentation slide content;
detecting a further triggering event to associate the metadata of the replaced second presentation slide content with the timecode of the identified audio sample of the plurality of audio samples of the soundtrack; and
associating the metadata of the replaced second presentation slide content in the presentation slide with the timecode of the identified audio sample.

10. A system for synchronizing a plurality of presentation slide content in a presentation slide with a soundtrack, the system comprising:
a memory; and
a processor communicatively coupled to the memory, wherein the memory stores instructions executable by the processor, and wherein upon execution of the stored instructions the processor is configured to:
obtain the plurality of presentation slide content arranged in a predefined order in the presentation slide, each presentation slide content associated with a metadata representing unique identification of the corresponding presentation slide content, wherein the presentation slide content comprises a video in the presentation slide or an animation in the presentation slide;
obtain the soundtrack including a plurality of audio samples, each audio sample being indexed with a corresponding timecode;
detect a triggering event identifying an audio sample from the plurality of audio samples of the soundtrack to transition from a first presentation slide content to a second presentation slide content of the plurality of presentation slide content in the presentation slide;
obtain a timecode indexed with the identified audio sample of the soundtrack corresponding to the detected triggering event;
associate the obtained timecode with the metadata of the second presentation slide content in the presentation slide to link the second presentation slide content in the presentation slide with the identified audio sample; and
generate a synchronized presentation multimedia file having the linked second presentation slide content in the presentation slide with the identified audio sample.

11. The system of claim 10, wherein the triggering event includes one of a mouse click, a key press, a screen touch, or a textual mark in transcribed text file of the soundtrack.

12. The system of claim 10, wherein the processor is configured to detect the triggering event in real time while the soundtrack is being played to identify the audio sample from the plurality of audio samples of the soundtrack to transition from the first presentation slide content to the second presentation slide content in the presentation slide.

13. The system of claim 10, wherein the processor is further configured to:
transcribe the soundtrack into a text file,
wherein the processor detects the triggering event by detecting a textual mark in the text file, the textual mark being added in proximity to a word associated with the audio sample to transition from the first presentation slide content to the second presentation slide content in the presentation slide.

14. The system of claim 13, wherein the processor is configured to obtain a timecode indexed with the identified audio sample of the soundtrack corresponding to the detected triggering event by:
associating the transcribed text file with the timecode associated with the corresponding audio samples; and
obtaining the timecode associated with the detected textual mark in the text file based on the association.

15. The system of claim 13, further comprising:
a user interface communicatively coupled to the processor, wherein the user interface is configured to receive input indicating edits to the transcribed text file associated with the soundtrack,
wherein the processor is further configured to update the corresponding soundtrack based on the received input.

16. The system of claim 10, further comprising:
a display; and
a user interface, the display and the user interface communicatively coupled to the processor, wherein the user interface is configured to receive input to generate a synchronized presentation multimedia file for preview,
wherein the processor is further configured to generate the synchronized presentation multimedia file for preview by:
detecting a current timecode associated with the soundtrack being played;

determining whether the current timecode is associated with metadata of any presentation slide content of the plurality of presentation slide content in the presentation slide; and displaying the presentation slide content on the display when the current timecode is associated with metadata of a presentation slide content in the presentation slide.

17. The system of claim 10, further comprising:

a user interface communicatively coupled to the processor, wherein the user interface is configured to receive input to manually adjust the obtained timecode, wherein the processor is further configured to update the obtained timecode to reflect the manually adjusted timecode.

18. The system of claim 10, further comprising:

a user interface communicatively coupled to the processor, wherein the user interface is configured to receive one or more edits to the second presentation slide content of the plurality of presentation slide content in the presentation slide, wherein the processor is further configured to:

update the second presentation slide content in the presentation slide to reflect the received one or more edits;

replace the corresponding second presentation slide content in the obtained plurality of presentation slide content with the updated second presentation slide content;

detect a further triggering event to associate the metadata of the replaced second presentation slide content with the timecode of the identified audio sample of the plurality of audio samples of the soundtrack; and associate the metadata of the replaced second presentation slide content in the presentation slide with the timecode of the identified audio sample.

19. A method for synchronizing a plurality of presentation slide content with a soundtrack, the method comprising:

obtaining the plurality of presentation slide content arranged in a predefined order, each presentation slide content associated with a metadata representing unique identification of the corresponding presentation slide content;

obtaining the soundtrack including a plurality of audio samples, each audio sample being indexed with a corresponding timecode;

detecting a triggering event identifying an audio sample from the plurality of audio samples of the soundtrack to transition from a first presentation slide content to a second presentation slide content of the plurality of presentation slide content;

obtaining a timecode indexed with the identified audio sample of the soundtrack corresponding to the detected triggering event;

associating the obtained timecode with the metadata of the second presentation slide content to link the second presentation slide content with the identified audio sample;

generating a synchronized presentation multimedia file having the linked second presentation slide content with the identified audio sample;

receiving one or more edits to the second presentation slide content of the plurality of presentation slide content;

updating the second presentation slide content to reflect the received one or more edits;

replacing the corresponding second presentation slide content in the obtained plurality of presentation slide content with the updated second presentation slide content;

detecting a further triggering event to associate the metadata of the replaced second presentation slide content with the timecode of the identified audio sample of the plurality of audio samples of the soundtrack; and associating the metadata of the replaced second presentation slide content with the timecode of the identified audio sample.

20. The method of claim 19, wherein the presentation slide content comprises one or more of a presentation slide, a video in the presentation slide, or an animation in the presentation slide.

* * * * *